United States Patent [19]

Randmae

[11] 4,414,576
[45] Nov. 8, 1983

[54] HOUSING ASSEMBLY FOR ELECTRICAL APPARATUS

[75] Inventor: Rein S. Randmae, Fort Salonga, N.Y.

[73] Assignee: Vicon Industries, Inc., Plainview, N.Y.

[21] Appl. No.: 305,401

[22] Filed: Sep. 25, 1981

[51] Int. Cl.$^3$ .................... H04N 5/26; H04N 7/18
[52] U.S. Cl. .................................. 358/229; 361/384; 361/391
[58] Field of Search .............. 358/229; 361/380, 384, 361/390, 391

[56] References Cited

U.S. PATENT DOCUMENTS

| | | | |
|---|---|---|---|
| D. 213,300 | 2/1969 | Buck | 358/229 |
| 3,164,838 | 1/1965 | Heinrich | 358/229 |
| 3,879,742 | 4/1975 | Smith | 358/229 |
| 4,281,343 | 7/1981 | Monteiro | 358/229 |

Primary Examiner—Howard Britton
Attorney, Agent, or Firm—Darby & Darby

[57] ABSTRACT

A housing assembly is provided for use with a remote electronic surveillance camera or the like, having a removable housing cover which permits rapid access to the interior of the housing assembly for service and adjustments. The cover is connected to the housing with a plurality of latching mechanisms which combine both latching and hinging functions in a single unit. The latching mechanisms cooperate with each other to allow hinging of the housing cover about a number of different axes, and further permit complete removal of the cover. A specially designed locking mechanism is also disclosed which provides the above-mentioned latching and hinging features while securing the housing assembly against unauthorized intrusion.

The preferred embodiment of the invention further discloses a fan assembly and heating element which are used to maintain a desired temperature range inside the housing for optimum performance of an electronic surveillance camera mounted therein. The air flow pattern created by the fan assembly may also be directed past optical surfaces inside and outside of the housing to keep atmospheric contaminants such as dust and moisture from settling on the surfaces and distorting optical transmissions to the camera.

11 Claims, 12 Drawing Figures

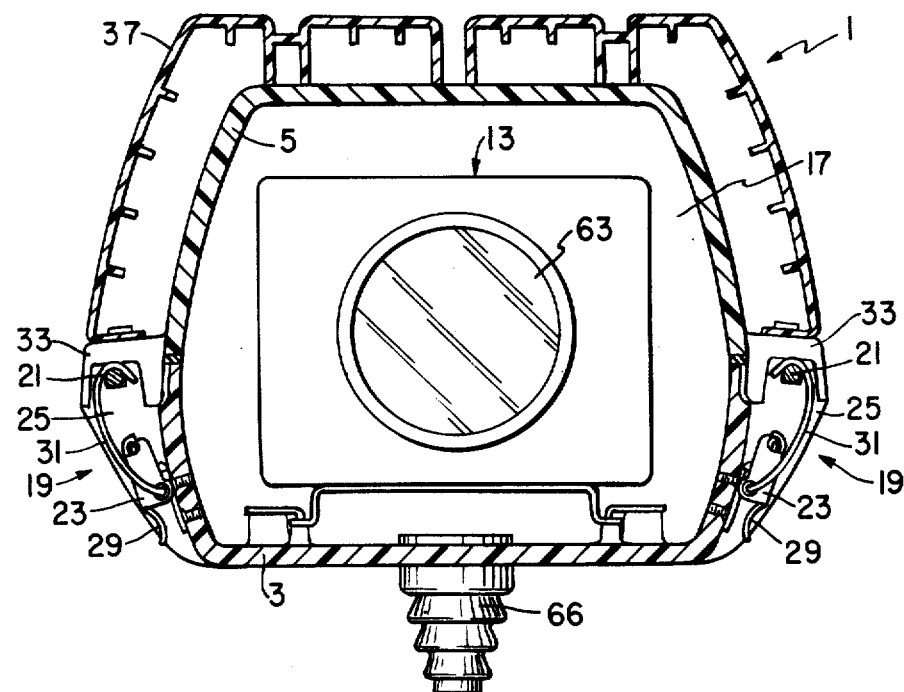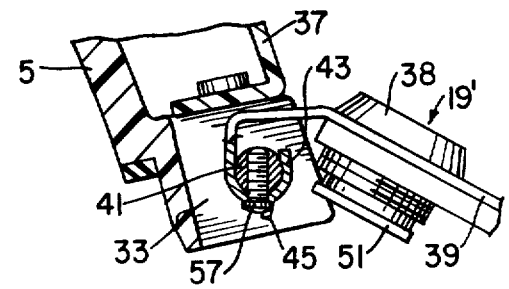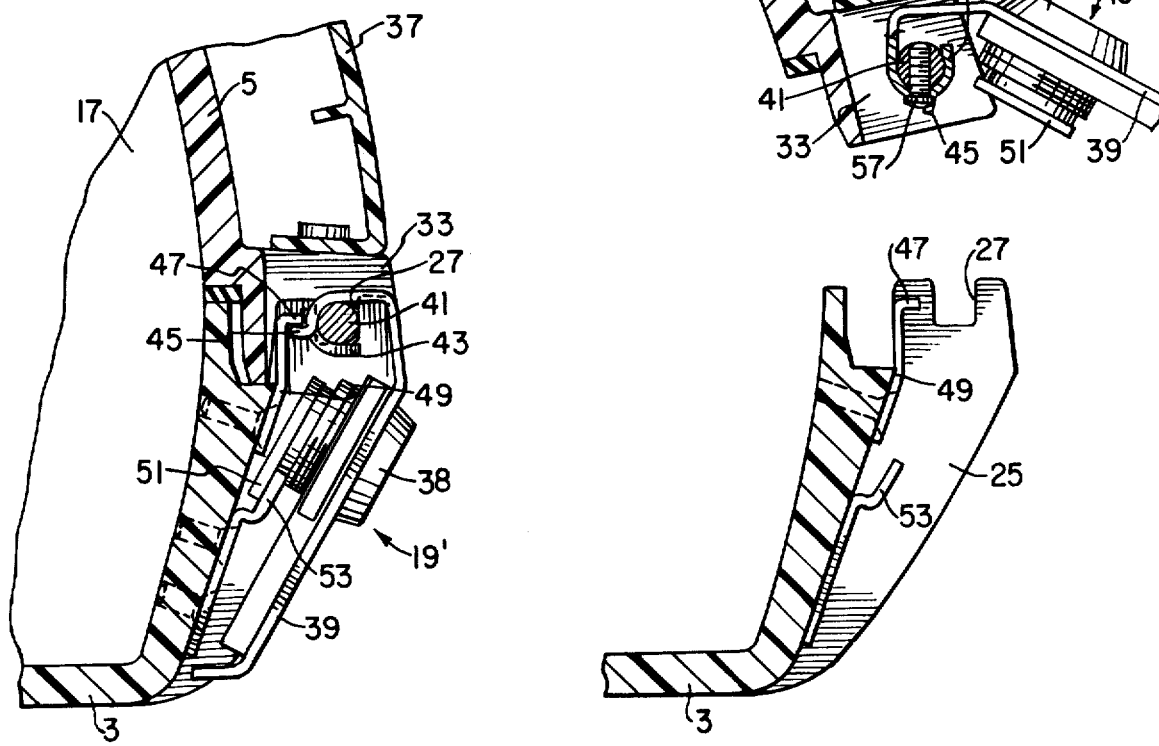

HOUSING ASSEMBLY FOR ELECTRICAL APPARATUS

BACKGROUND OF THE INVENTION

This invention relates generally to housing assemblies for electrical apparatus, and, more particularly, to housings which protect television surveillance equipment.

Housing assemblies have been used in the prior art to isolate remote surveillance cameras and other electrical equipment from environmental conditions such as heat, dust and moisture, as well as providing protection from theft, tampering and other physical disturbances which may be encountered with exposed electronic equipment.

One of the problems associated with designing such housing assemblies is providing for rapid access to the equipment inside of them for servicing, adjustment or connection of external devices. Housing assemblies of the prior art generally are provided with either hinged or removable covers which may be quickly unfastened to expose the interior compartment of the housing assembly. While the hinged covers provide a convenient method of access for performing minor repairs to equipment within a housing assembly without removing and setting aside the cover, present hinging systems do not facilitate repairs that require access to the side of the equipment nearest the hinges, as this side is generally blocked by the cover. It would therefore be desirable for a housing assembly to have a cover hinging system which provides increased access to the equipment for "in situ" adjustments and repairs while still permitting rapid removal of the cover for more extensive servicing. Such a housing assembly would preferably include a locking mechanism to guard against theft and to prevent unauthorized personnel from tampering with the equipment.

As harsh environmental conditions are a frequent cause of electrical malfunctioning, it is imperative that a housing assembly provide protection against any such conditions that are likely to be encountered in normal use. Extremes of heat and cold may hinder the performance of semiconductors used in electrical equipment, and airborne contaminants such as heat and moisture create shortcircuiting hazards if allowed to come in contact with any current carrying surfaces inside the equipment. Airborne contaminants create a further problem when optical equipment is encased in a housing assembly, since the camera lens and the window through which it receives images must be kept clean in order to assure a clear picture. The solution of these and other environmentally related problems with a minimum of cost and complexity would provide greatly increased flexibility in the development of remote electronic surveillance systems.

It is therefore an object of the present invention to provide an improved housing assembly for remote electronic surveillance equipment or the like;

It is specifically an object to provide such a housing assembly with an improved system for latching and hinging a housing cover;

It is a further object to provide such a latching and hinging system with an integral locking means to prevent unauthorized access to the interior of the housing assembly;

It is another object to provide a housing assembly for electronic surveillance equipment which isolates such equipment from its surrounding environment.

SUMMARY OF THE INVENTION

In accordance with a preferred, but nonetheless illustrative embodiment of the present invention, a housing assembly for use with a remote electronic surveillance camera or the like includes a removable housing cover which permits rapid access to the interior of the housing assembly for service and adjustments. The cover is connected to the housing with a plurality of latching mechanisms which combine both latching and hinging functions in a single unit. The latching mechanisms cooperate with each other to allow hinging of the housing cover about a number of different axes, and further permit complete removal of the cover. A specially designed locking mechanism is also disclosed which provides the above-mentioned latching and hinging features while securing the housing assembly against unauthorized intrusion.

The preferred embodiment of the invention further discloses a fan assembly and heating element which are used to maintain a desired temperature range inside the housing for optimum performance of an electronic surveillance camera mounted therein. The air flow pattern created by the fan assembly may also be directed past optical surfaces inside and outside of the housing to keep atmospheric contaminants such as dust and moisture from settling on the surfaces and distorting optical transmissions to the camera.

BRIEF DESCRIPTION OF THE DRAWINGS:

In describing the preferred embodiment of the present invention, reference will be made to the appended drawings in which:

FIG. 5 is a sectional view substantially along the line 5—5 of FIG. 4, illustrating the housing assembly with its cover secured by latching mechanisms;

FIG. 9 is an enlarged side sectional view substantially along the line 9,10—9,10 of FIG. 8, showing the latching mechanism in the locked position;

FIG. 10 is an enlarged sectional view as in FIG. 9, showing the latching mechanism in the unlatched position with the housing cover lifted away from the lower housing;

DESCRIPTION OF THE PREFERRED EMBODIMENT

Figure 1:
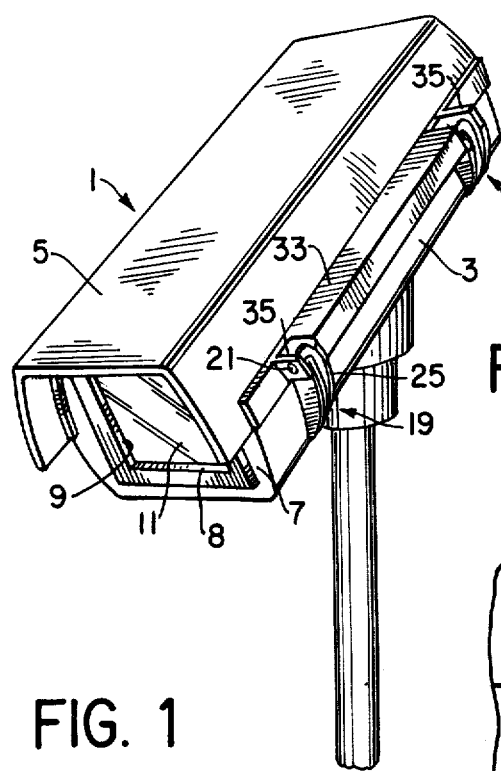
FIG. 1 is a perspective view of a housing assembly in accordance with the present invention.

Referring now to the drawings, FIG. 1 is a perspective view showing the housing assembly 1 of the present invention as it would appear in normal use, mounted on a boom or a similar supporting device used to elevate the housing assembly above the reach of passers-by.

Figure 2:
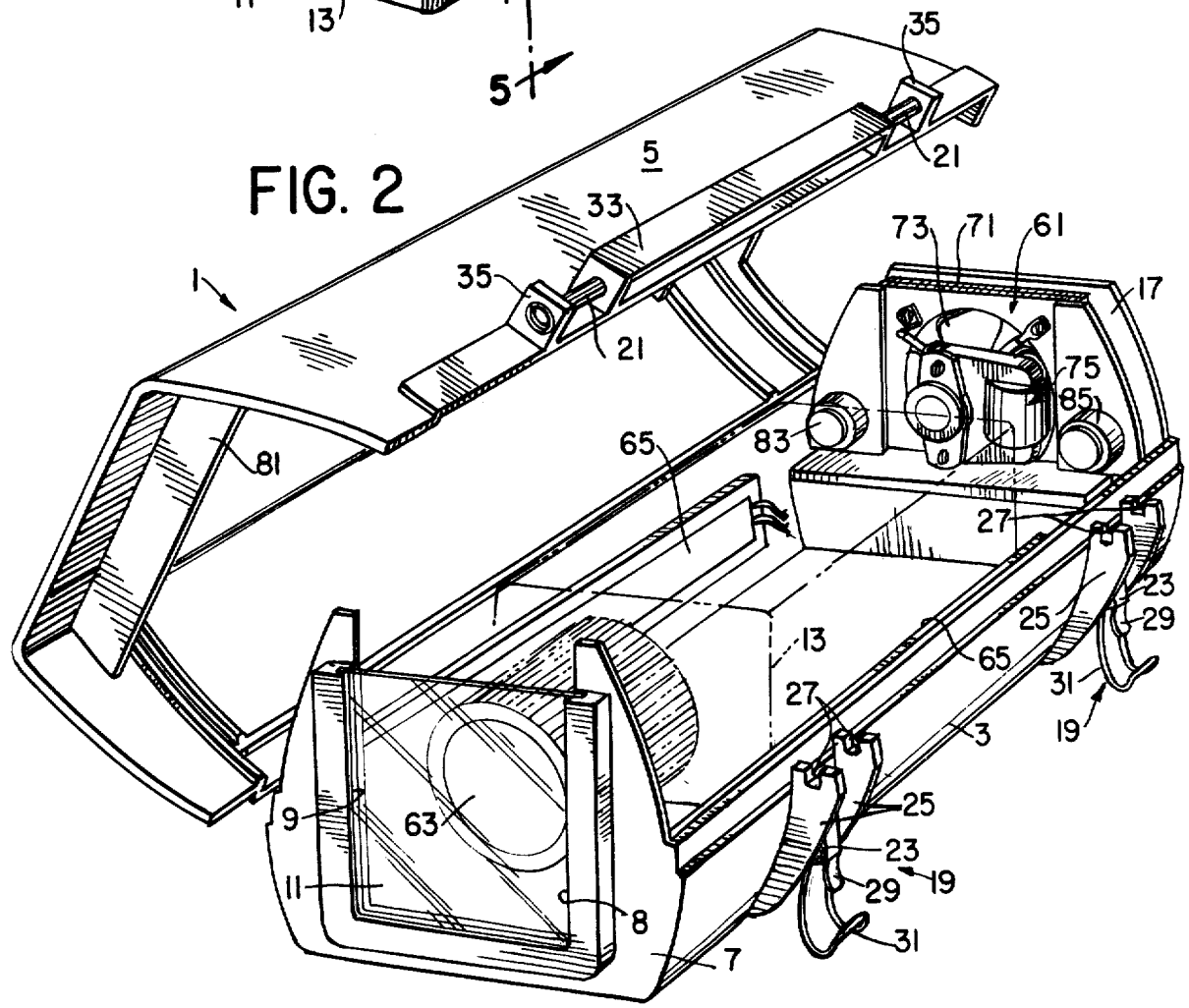
FIG. 2 is an enlarged perspective view of the housing assembly of FIG. 1, with the housing cover hinged upward to expose the interior of the housing compartment.

As seen in FIG. 2, the housing assembly 1 comprises a longitudinally extending lower housing 3 which is substantially U-shaped in lateral cross-section and a longitudinally extending upper half housing 5, also U-shaped in lateral cross-section, which is designed to matingly engage the lower half housing 3 along the sides of the housing assembly 1. The front wall 7 of the lower housing 3 has a U-shaped opening 8 bordered by a channel 9 which holds a window 11 through which optical images are transmitted to a television camera 13 inside the housing assembly 1. The rear portion of the lower housing 3 comprises a solid lateral wall 17 which bridges the sides of the lower housing 3. When the housing cover 5 is seated atop the lower housing 3, the camera 13 is completely enclosed by the housing assembly 1 which acts as a protective shell isolating the camera from rain, dust and shock.

In order to provide access to the camera 13 mounted inside the housing assembly 1, the present invention includes a latch system for securing the housing cover 5 which permits the housing cover to be pivoted to an open position from either the right or the left side of the lower housing, and also permits complete removal of the housing cover 5 for unobstructed access to the interior of the housing assembly 1. This is accomplished by a combination of four latching mechanisms 19, two on each side of the housing assembly, which permit hinged movement about a pivotal pin 21 when the mechanism is fastened and which release the pin 21 for upward movement when the latching mechanism 19 is unfastened.

Latching mechanism 19 comprises a latch 23 which holds pin 21 in a hinge seat provided by two ribs 25 on the exterior side wall of lower housing 3. When the housing cover 5 is closed, the pin 21 is seated in notches 27 at the top of each rib 25 to support the pin 21 and restrict it from movement other than rotation or upward movement away from the notches 27. The latch 23, which is fastened to the lower housing 3 by screws or similar fastening means, comprises a hinged plate 29 which uses a lever action to apply tension to a wire clamp 31. The wire 31 is bent in the shape of a hook which engages pin 21 and holds the pin in the hinge seat formed by notches 27.

Figure 3:
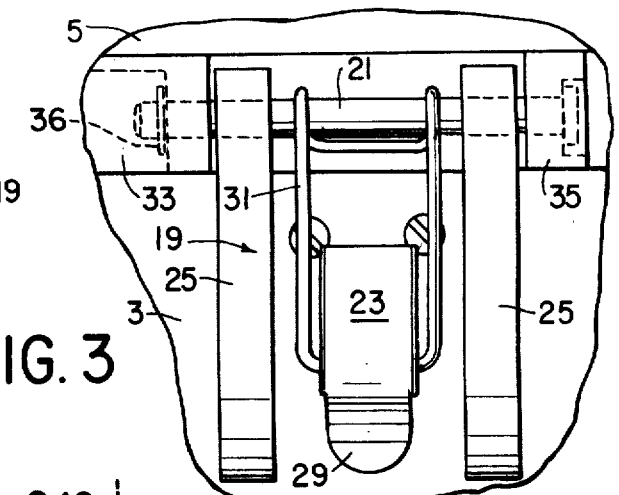
FIG. 3 is an enlarged side elevational view of a portion of the housing assembly of FIG. 1.

FIG. 3 is a partial elevational view of the latching mechanism 19 showing the connection of pin 21 to the housing cover 5. The pin 21 is inserted through support block 35 and into the side of support bracket 33, and is held in place by C clip 36. The pin is therefore supported away from the body of the housing cover 5, permitting the housing cover to be pivoted about the pin 21 when the pin is seated in notches 27.

Figure 4:
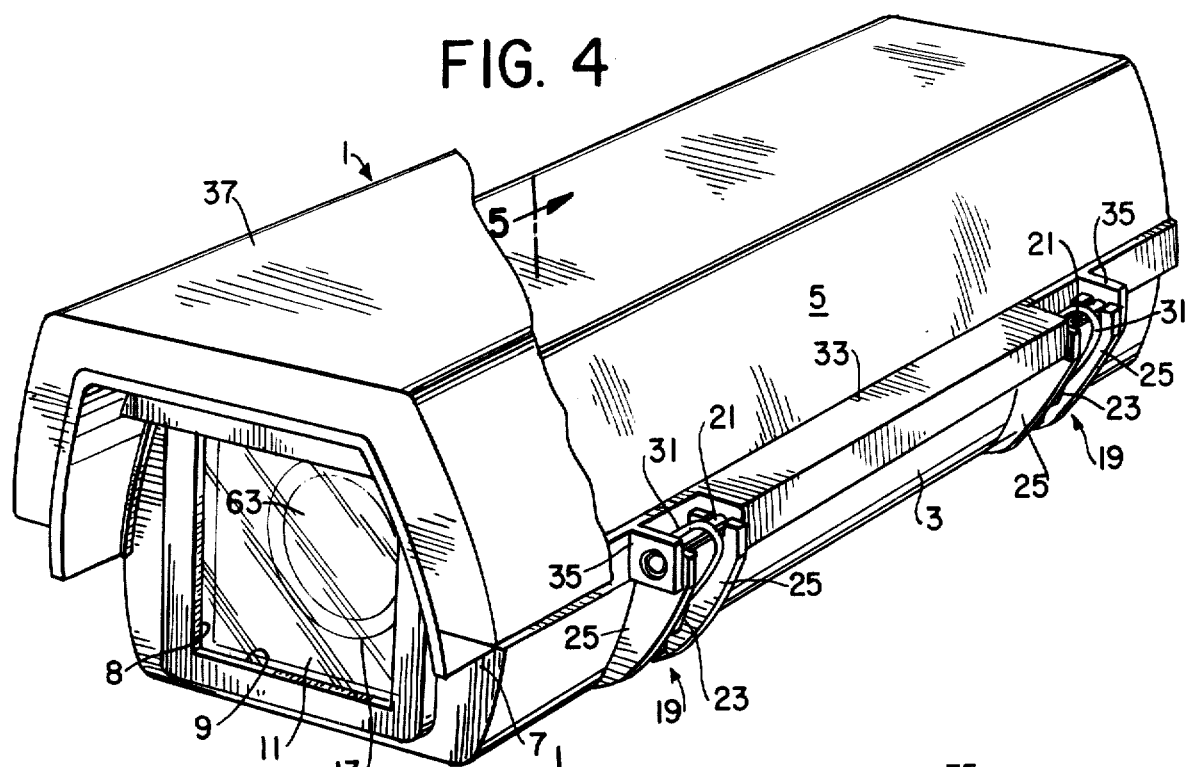
FIG. 4 is a perspective view of a housing assembly with a sun shield which has been broken away to expose the housing cover.

FIG. 4 is a perspective view of the housing assembly with the housing cover 5 closed and latching mechanisms 19 fastened. Also shown in an optional sun hood 37, a portion of which has been broken away to clearly show the latched mechanisms 19 on the right side of the housing assembly 1.

Figure 6:
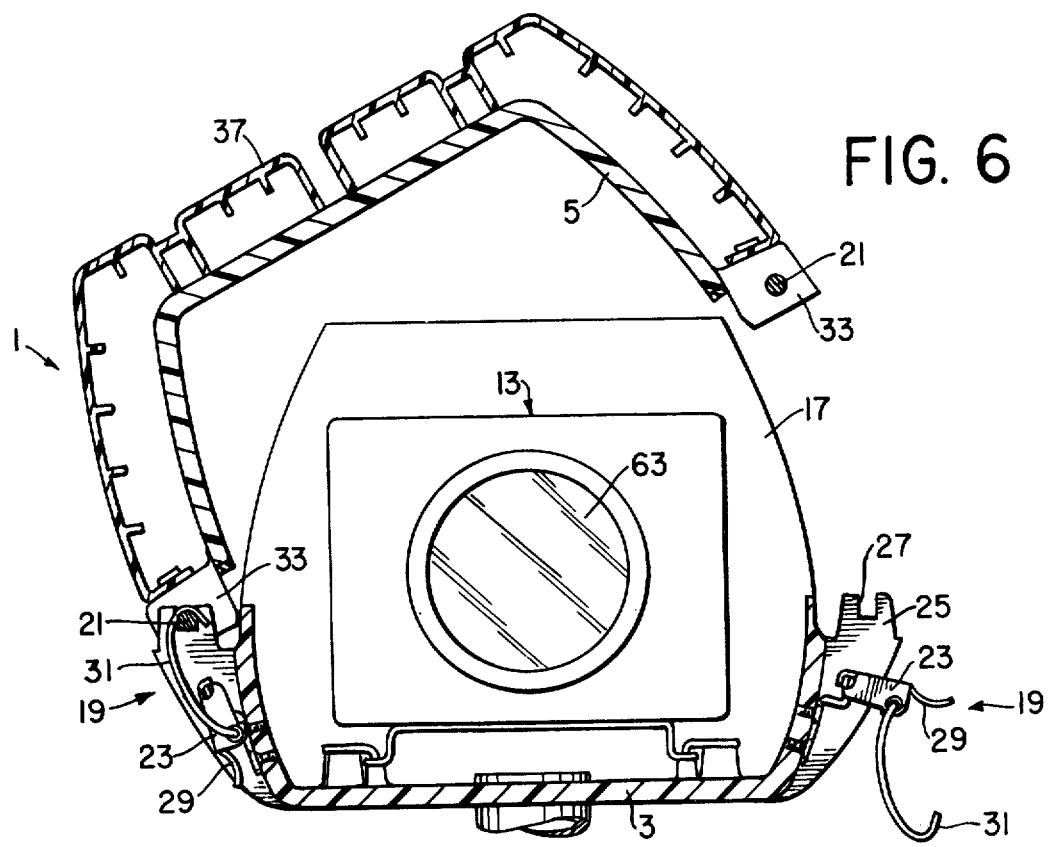
FIG. 6 is a sectional view as in FIG. 5, showing the left side latching mechanisms detached (right side in the drawing), and the housing hinged upward.
Figure 7:
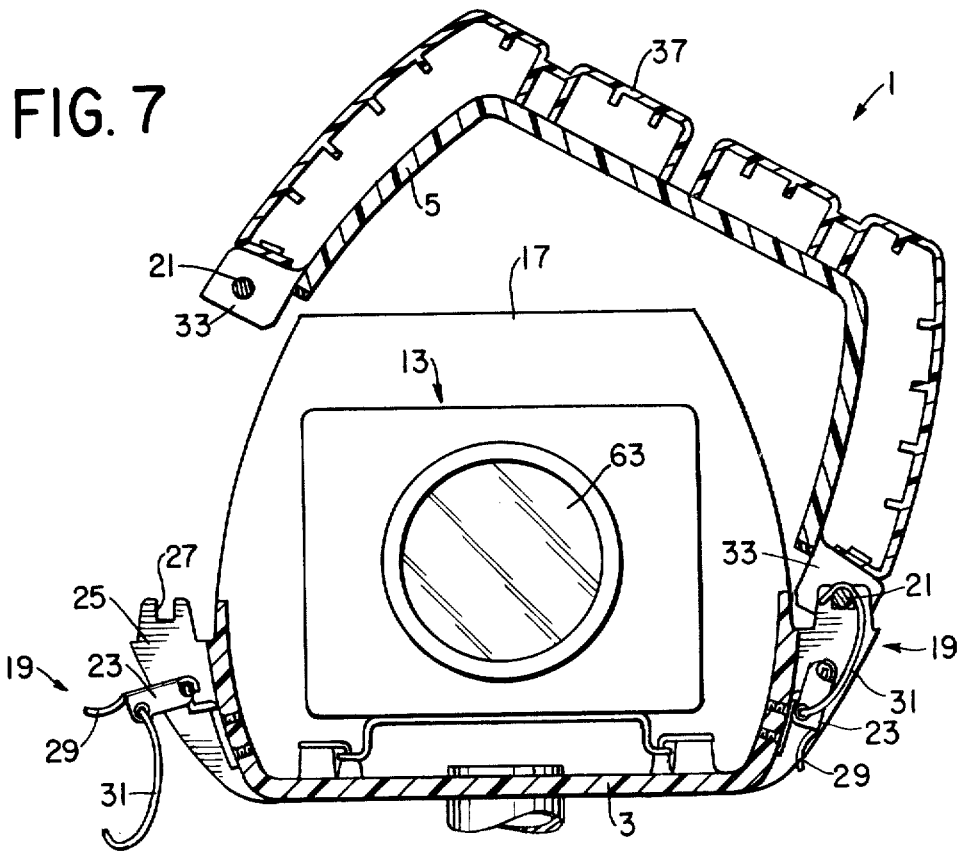
FIG. 7 is a sectional view as in FIG. 5, with the right side latching mechanisms detached (left side in the drawing) and the housing assembly hinged upward.

FIGS. 5, 6 and 7 are cross-sectional views of the housing assembly of FIG. 4 taken substantially along the line 5—5 of FIG. 4, illustrating the hinging and latching action of the latching mechanisms 19. In FIG. 5, the latching mechanisms 19 on both sides of the housing assembly 1 are fastened, securing the housing cover 5 to the lower housing 3. In FIG. 6, the two latching mechanisms 19 on the left side of the housing assembly 1 (right side in the drawing) have been unfastened, permitting the housing cover 5 to pivot about the two latching mechanisms 19 on the right side thereby providing access to the interior of the housing assembly along the left side thereof. In FIG. 7, the housing cover 5 is shown pivoted about the latched mechanisms 19 on the left side of the housing assembly (right side in the drawing), permitting access to the interior of the right side of the assembly. From these illustrations (FIGS. 6 and 7) it can be seen that the cover 5 can be completely removed from the lower housing 3 by releasing all four latching mechanisms 19, permitting complete access to the interior compartment. This configuration would be particularly advantageous during the installation of the television camera or when performing extensive repairs.

Figure 8:
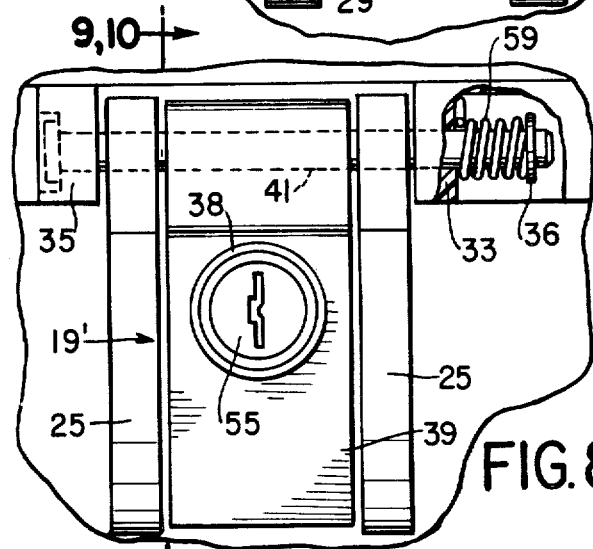
FIG. 8 is an enlarged side elevational view of a housing assembly illustrating an alternate embodiment of the latching mechanism of FIG. 3.
Figure 12:
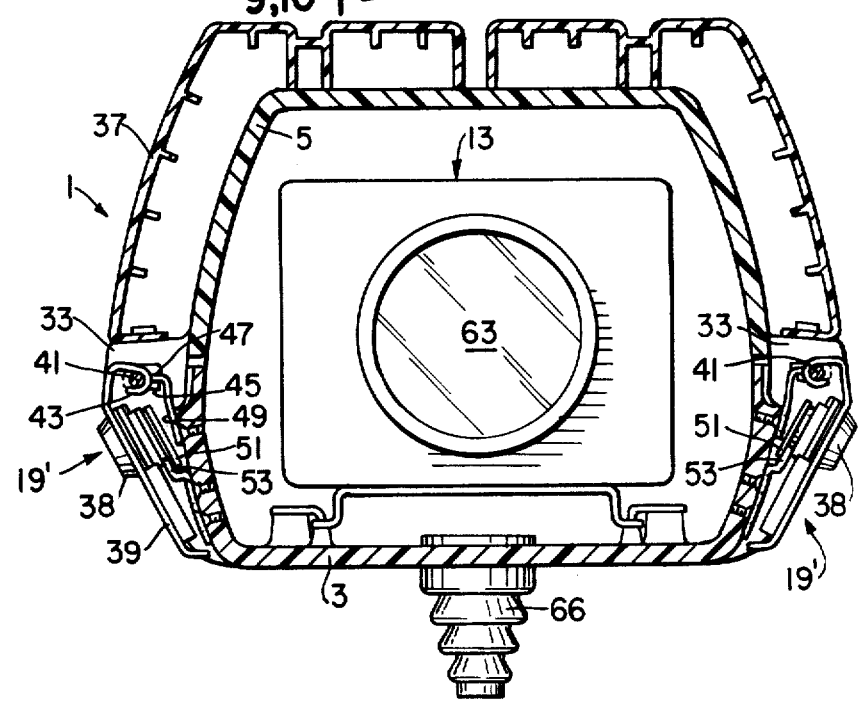
FIG. 12 is a sectional view of a housing assembly as in FIG. 5, shown with the locking latching mechanisms of FIG. 8.

FIGS. 8, 9, 10 and 12 illustrate elevational and cross-sectional views of an alternate embodiment of the inventive latching mechanism 19', shown in the fastened or latched position in FIGS. 8, 9 and 12, and in the unlatched position in FIG. 10. This embodiment incorporates a lock 38 which secures the latching mechanism 19' in the fastened position to inhibit theft of or tampering with the television camera 13 inside the housing assembly 1. Locking mechanism 19' comprises a latch plate 39 which pivots on a pin 41 similar to the pin 21 of latching mechanism 19. The latch plate 39 includes a hooked portion 43 through which the pin 41 is inserted when the latching mechanism 19' is assembled. The outer surface of the hooked portion 43 includes a protrusion 45 which engages a flange 47 on retaining plate 49 when the latching mechanism 19' is fastened, thus opposing any upward movement of the pin 41 out of the hinge seat formed by notches 27. The lock 38 includes an arm 51 which engages locking bracket 53 when the latch plate 39 is rotated downward and the lock cylinder 55 is turned to the locked position as shown in FIGS. 8, 9 and 12.

In the preferred embodiment of locking mechanism 19', the latch plate 39 is attached to the pin 41 with a screw 57, which screws into a laterally bored hole in the pin to prevent the latch plate 39 from swiveling on the pin 41. A torsion spring 59 mounted between the side of support bracket 33 and C clip 36 applies a torsional force to pin 41 urging the latch plate 39 to the position illustrated in FIG. 10 when the lock 38 is not engaging retaining plate 53. This facilitates the unfastening of latching mechanism 19' and simplifies the latching process by maintaining protrusion 45 out of engagement with flange 47 while the pin 41 is being seated in notches 27.

FIG. 12 illustrates the embodiment of the present invention with latching mechanisms 19' fastening the housing cover 5 to the lower housing 3, as previously illustrated in FIG. 5 with latching mechanisms 19. While the use of four locking latch mechanisms 19' offers the greatest security against unauthorized opening of the housing assembly 1, it may be desirable from a cost standpoint to only use two locking latch mechanisms 19' in combination with two regular latch mechanisms 19. In this case, the locking latch mechanisms 19' should preferably be positioned on opposite sides of the housing assembly 1 and diagonally opposed to each other in order to secure the front and rear end of the housing cover 5.

Figure 11:
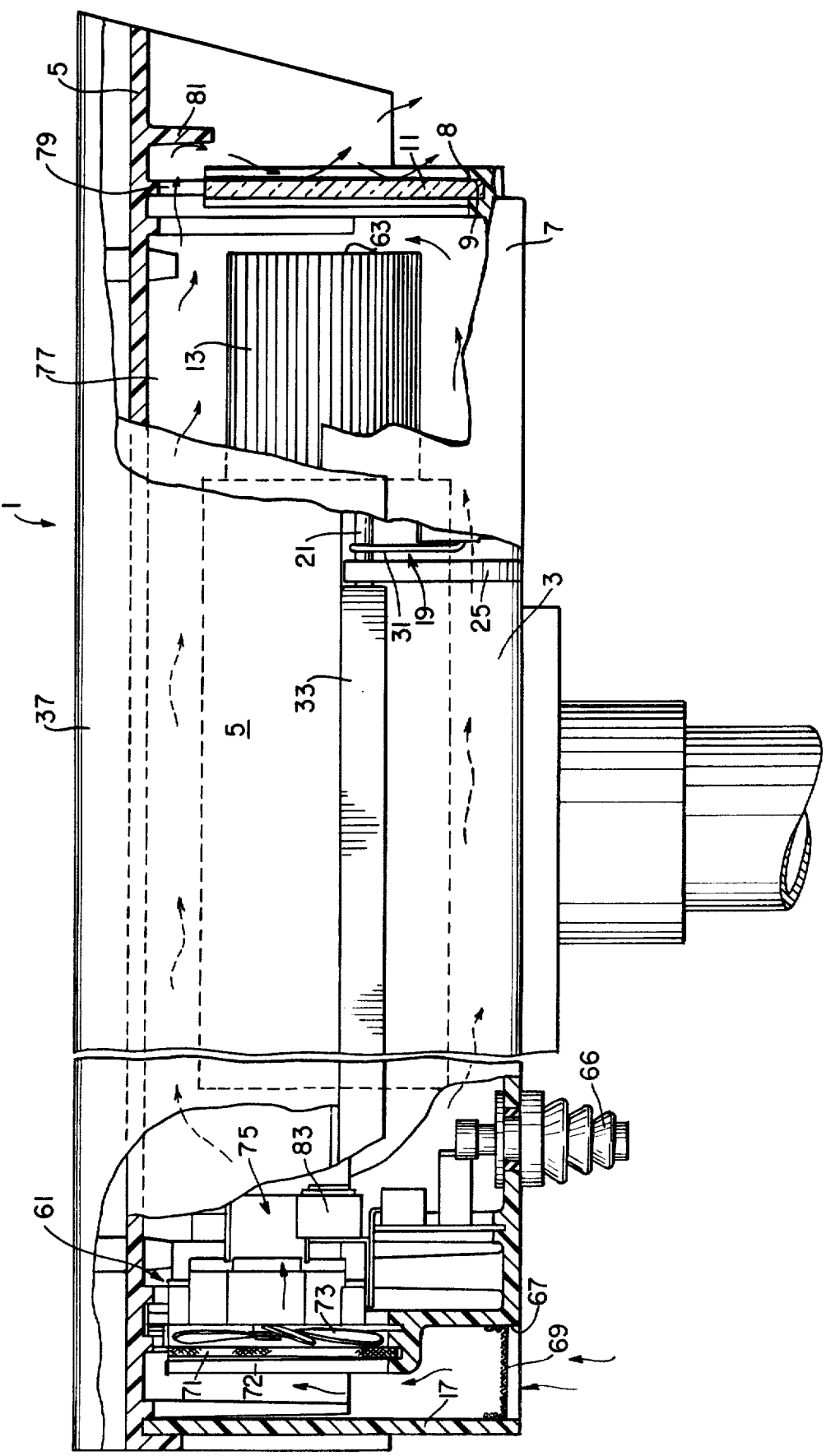
FIG. 11 is a side elevational view of a housing assembly with portions broken away to show the interior compartment.

The preferred embodiment of the present invention also incorporates several features which help to achieve optimum camera performance in an outdoor environment. As illustrated in FIGS. 2 and 11, fan assembly 61 circulates outside air through the interior of the housing assembly 1 to prevent overheating of the camera 13 (shown in phantom) in hot weather, and further directs a flow of air past the camera lens 63 and window 11 to keep dust, moisture and other atmospheric contaminants from settling thereon. Heating elements 65 are further provided to warm the interior of the housing assembly in cold weather to assure proper camera performance. Power and data transmission cables for the camera, fan and heating elements enter the lower housing 3 through bellows 66 which helps to seal the entry point of these cables into the housing assembly and also provides for their strain relief.

The operation of fan assembly 61 is illustrated in FIG. 11 which shows the direction of air circulation through a side cross-sectional view of the housing assembly 1. Air is drawn into the housing assembly through intake port 67 located at the rear of the lower housing 3. A screen 69 may be provided at the intake port 67 to prevent insects and large airborne particles from entering the housing assembly. The incoming air is then drawn through filter material 71 which removes dust and other fine particles from the air which flows through opening 72. The air then travels past impeller 73 which is powered by blower motor 75 and enters the interior compartment 77 of the housing assembly 1. The interior compartment 77 is sealed from the external environment by gaskets or other appropriate sealing means at all points except for the filter covered opening 72 and outlet slot 79 located above the window 11. As shown by the arrows in FIG. 11, air which is drawn in by impeller blades 73 is circulated around camera 13 and past camera lens 63, and exists the interior compartment through outlet slot 79. The air flow is then deflected by baffle 81 located on the housing cover 5 above and just in front of window 11. The baffle 81 directs the air flow past the front of window 11, which prevents dust and other atmospheric contaminants from settling thereon and also helps to remove fog and water droplets which may accumulate on humid or rainy days. The flow of air past camera lens 63 as illustrated in FIG. 11 also prevents dust in the interior compartment 77 from settling on the camera lens thus further aiding in the maintenance of a clear television picture.

Heating elements 65 are provided to warm the interior compartment 77 when the temperature drops below the optimum operating temperature range for the camera 13, as detected by thermostat 83. Since air drawn into the interior compartment 77 by blower motor 75 serves to cool the camera 13 and counteracts the effect of heating elements 65, it may be desirable to turn off blower motor 75 when the temperature drops below a predetermined level, particularly when the housing assembly is in a relatively clean environment and the window clearing feature of the blower motor 75 is not continuously needed. Under these conditions it may be useful to turn off the blower motor entirely, or to operate it intermittently to provide occasional clearing of the window 11. A separate thermostat 85 (FIG. 2) may be provided to turn off the blower motor 75 at a different temperature than the switching temperature of thermostat 83 which controls heating elements 65. Alternatively, the switching off of the blower motor 75 and switching on of the heating elements 65 may be performed concurrently, in which case only one thermostat 83 would be needed.

Although the above description discloses a preferred form of the invention for illustrative purposes, those skilled in the art will appreciate that many additions, modifications or substitutions may be made without departing from the scope and spirit of the invention as defined in the accompanying claims.

What is claimed is:

1. A housing assembly for electronic surveillance apparatus, comprising:
   complementary first and second housing members defining an enclosed region when joined together;
   first hinge means for joining said first and second housing members in hinged relationship about a first axis;
   second hinge means for joining said first and second housing members in hinged relationship about a second axis, different from said first axis; and
   said first and second hinge means each having means for independently releasing its respective hinge means to permit said first and second housing members to hinge about the axis of the other hinge means.

2. A housing assembly as in claim 1,
   wherein each of said hinge means further comprises at least one latching mechanism for fastening said first and second housing members together, said latching mechanism including:
   shaft means mounted on said first housing member for supporting said member in hinged relation to said second member;
   means mounted on said second housing member for providing a hinge seat for said shaft means when said first and second housing members are joined, and shaped to receive said shaft means in a direction substantially perpendicular to said axis; and
   means for detachably retaining said shaft means in said hinge seat means while permitting hinged movement of said first and second housing members about the axis of said shaft means.

3. A housing assembly as in claim 2, wherein said means for detachably retaining said shaft means in said hinge seat means comprises:
   a latch plate mounted on said shaft means and rotatable about the axis thereof, and
   means for detachably securing said latch plate to said second housing member.

4. A housing assembly as in claim 1 wherein said retaining means are independently detachable from the respective shaft means.

5. A housing assembly as in claim 4, wherein said housing assembly comprises a horizontally elongated structure with vertically oriented right and left side walls, wherein said first and second housing members are joined along a substantially horizontal junction line on each of said right and left side walls, and said first and second hinge means are mounted respectively on said right and left side walls.

6. A housing assembly as in claim 2 wherein said shaft means is attached to said first housing member by a plurality of support arms extending outwardly from the surface of said first housing member and suspending said shaft means away from and substantially parallel to said first housing member.

7. A housing assembly as in claim 6 wherein said hinge seat means comprises at least one slotted member extending outwardly from the surface of said second housing member, said slot positioned to receive said shaft means when said first and second housing members are joined.

8. A housing assembly as in claim 7 wherein said retaining means comprises a clamping member having a hooked end and a free end, the tip of said hooked end dimensioned for insertion between said shaft means and said first housing member when said shaft means is seated in said slotted member, and means attached to said second housing member and to the free end of said clamping member for tensioning said free end after said insertion of said hooked end.

9. A housing assembly for electronic surveillance apparatus, comprising:

complementary first and second housing members defining an enclosed region when joined together; and at least one latching mechanism for fastening said first and second housing members together, said latching mechanism including:

shaft means mounted on said first housing member for supporting said member in hinged relation to said second member about the axis of said shaft means;

means mounted on said second housing member for axially receiving said shaft means when said first and second housing members are joined, and means for detachably retaining said shaft means in said receiving means, including a latch plate mounted on said shaft means and rotatable about the axis thereof, and means for detachably securing said latch plate to said second housing member;

said means for detachably securing said latch plate including an arm pivotally mounted on said latch plate, bracket means mounted on and extending outwardly from said second housing member forming a channel between said bracket means and said second housing member for receiving said arm, means for pivoting said arm into and out of said channel, a flange mounted on and projecting substantially perpendicularly from said second housing member, and a tab projecting from said latch plate in a substantially radial relationship to said shaft means and positioned to engage said flange when said latch plate is rotated against said second housing member.

10. A housing assembly as in claim 9, wherein said pivoting means comprises a lockable cylinder journaled in said latch plate.

11. A housing assembly as in either of claims 9 or 10 wherein said latch plate is fixedly attached to said shaft means and said shaft means further comprises torsion spring means acting about the axis of said shaft means for rotatably urging said latch plate away from said second housing member.

* * * * *